United States Patent [19]

Leshkowitz

[11] 4,012,789
[45] Mar. 15, 1977

[54] 10½ INCH TAPE REEL ADAPTOR

[76] Inventor: Victor Leshkowitz, 6 Airway Drive, Bellmore, N.Y. 11710

[22] Filed: July 24, 1975

[21] Appl. No.: 598,631

[52] U.S. Cl. .................................. 360/90; 360/83
[51] Int. Cl.² ...................................... G11B 15/26
[58] Field of Search ............ 360/90; 242/189, 190, 242/201

[56] References Cited
UNITED STATES PATENTS 3,813,690  5/1974  Oka ..................................... 360/90

*Primary Examiner*—Harold I. Pitts
*Attorney, Agent, or Firm*—Jack D. Slobod

[57] ABSTRACT

An adaptor rests on top of a standing tape recorder and includes a pair of motorized capstans spaced apart on at least 10½ inch centers for carrying 10½ inch diameter tape reels which project tape through the head of the tape recorder. The adaptor includes a control box connected to the housing by a cable. In record and play modes, the motors of the adapter are energized to torque the capstans in opposite directions for taking up tape payed out by the head. Fast forward and rewind modes are also utilized which are stopped by a braking circuit responsive to a motion detector.

5 Claims, 5 Drawing Figures

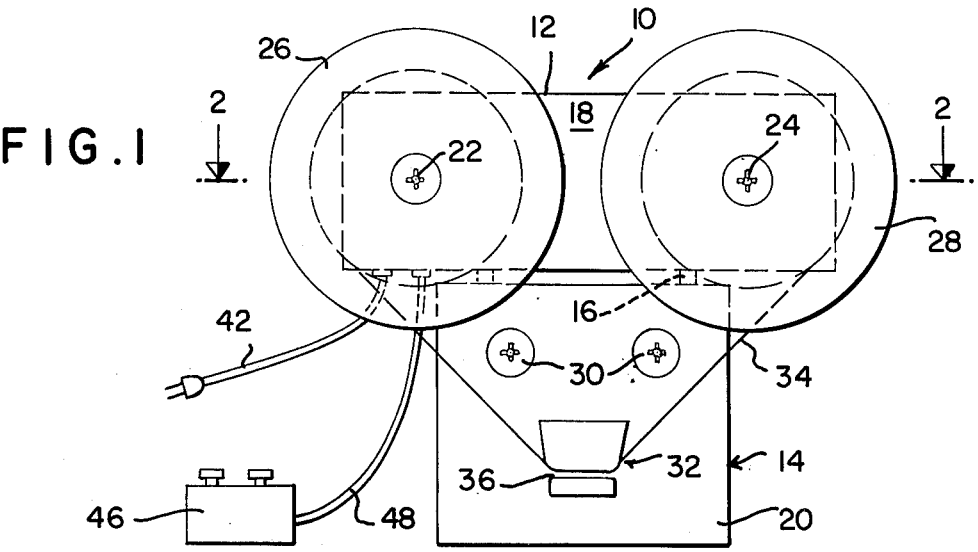
FIG.1
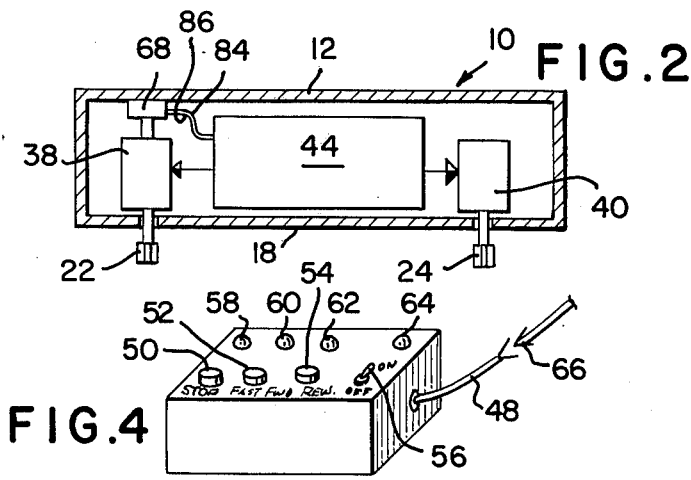
FIG.2
FIG.4
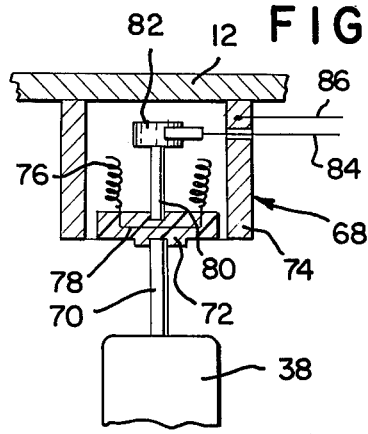
FIG.3
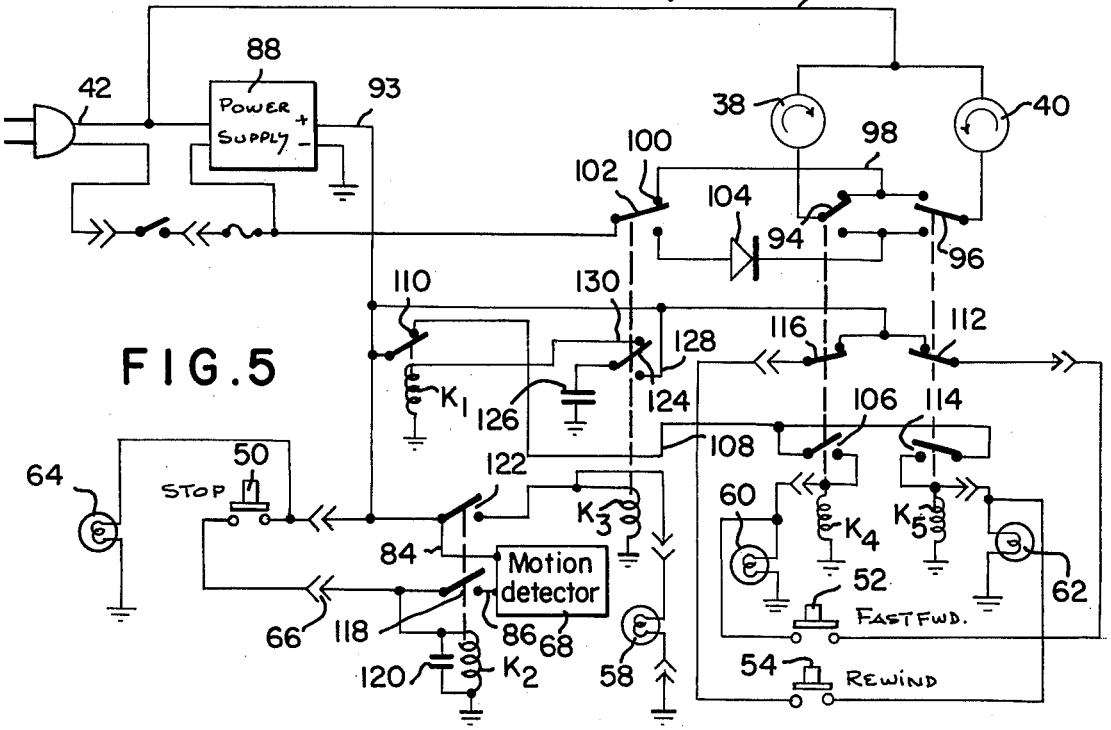
FIG.5

10½ INCH TAPE REEL ADAPTOR

FIELD OF THE INVENTION

The present invention relates generally to tape recorders and players. In its particular aspects the present invention relates to an adapter for carrying a pair of 10½ diameter takeup and supply tape reels positionable for projecting tape carried thereon through the head of a common tape player.

BACKGROUND OF THE INVENTION

The takeup and supply capstans on common open reel tape recorders and tape decks are spaced apart on approximately 7¼ inch centers. This spacing prevents such tape players from accepting 10½ diameter supply and takeup reels which are utilized for extremely long playing recordings.

OBJECTS OF THE INVENTION

It is an object of the present invention to provide an adapter for 10½ inch diameter tape reels for playing through the head of a common tape recording.

It is a further object of the present invention to provide a motorized adapter for 10½ inch diameter tape reels which motors are controlled for tape tensioning, fast forward, rewind, and braking.

SUMMARY OF THE INVENTION

Briefly, the aforementioned and other objects of the present invention are satisfied by providing a housing adapted to abut the side a tape player. A pair of capstans carried by the housing on at least 10½ inch centers are positioned, with the housing abutting the tape recorder, to project tape through the playing head of the tape recorder in operative position without interferring with the usual capstans on the tape player.

To prevent any disturbance of the position of the adapter with respect to the tape player, a control box for controlling motors driving the adapter capstans is umbilically connected to the adapter housing.

The adapter capstans are ordinarily driven in opposite directions during playing to tension the tape and takeup the same as it payed out in the playing head. Fast forward and rewind modes are mechanized by driving only a selected one of the capstans. These modes are terminated by a stop mode in which unidirectional braking current is applied to a selected one of A. C. motors driving the adapter capstans, during the time when a motion detector carried by one of the capstans indicates rotational motion.

Other objects, features and advantages of the present invention will become apparent upon perusal of the following detailed description of the preferred embodiment thereof when taken in conjunction with the appended drawing wherein:

FIG. 1 is a front elevational view of the adapter of the present invention in use;

FIG. 2 is a top cross-sectional view along the lines 2—2 in FIG. 1;

FIG. 3 is a cross-sectional enlargement of a portion of FIG. 2;

FIG. 4 is a pictorial presentation of a control box portion of FIG. 4; and

FIG. 5 is an electrical schematic for the adapter of the present invention.

DETAILED DESCRIPTION

Referring first to FIGS. 1 and 2 of the drawing, the adapter 10 of the present invention comprises an elongated rectangular housing 12 adapted to rest squarely on top of a standing open reel tape recorder or deck 14 via small rubber feet 16 on the bottom of the housing. The adapter is positioned in use with its rectangular front face 18 in line with the front face 20 of tape recorder 14.

Projecting from front face 18 are a pair of reel driving capstan keys 22 and 24 which are horizontally spaced apart at least 10½ inches, and preferably 10 5/8 inches, to provide clearance for accepting 10½ inch diameter supply and takeup reels 26 and 28.

Tape recorder or player 14, as is usual, has a pair of capstans 30 spaced horizontally or approximately 7¼ inch centers and located above playing and/or recording head 32. In use of the adapter 10, recording tape 34, carried by reels 26 and 28 is looped through head 32, the tape loop enclosing the capstans 30 in noninterferring relationship therewith.

As is usual, head 32 includes a synchronously driven tape engaging roller 36. Thus in a play mode, it is only necessary to tension tape 34 and takeup the tape as it payed out by roller 36. To this end A. C. induction motors 38 and 40 are provided within housing 12 coupled respectively to the drive keys 22 and 24.

For controlling motors 38 and 40, a power cord and wall plug 42 is provided leading to housing 12. Further, relay circuitry 44 is provided in housing 12 for controlling energization of the motors for play, fast forward, rewind and stop modes. To prevent disturbing the position of housing 12 on top of tape player 14, adapter 10 further comprises a separate control box 46, best illustrated in FIG. 4, which is connected to circuitry 44 in housing 12 by a long multi-conductor cable 48.

Control box 46 has a top face on which are disposed momentary contact push button switches 50, 52 and 54 respectively for initiating stop, fast forward and rewind modes. Furthermore, there is an on-off toggle switch 56. In addition, indicator lamps 58, 60, 62 and 64 are provided on control box 46 for indicating status respectively in regard to stop, fast forward, rewind and on-off. In the electrical schematic illustrated in FIG. 5, the various parts of circuitry 44 and control box 46 are shown in combined form. However, those lines connected by cable 48 are determinable therefrom by the spaced apart arrow symbol 66, which points toward items in control box 46.

Before discussing the electrical operation of the adapter 10, illustrated in FIG. 5, the operation of a motion detector 68 cooperating with a rearwardly extending shaft extension 70 of the armature of motor 38 should be understood with particular reference to FIG. 3. As depicted therein, shaft 70 carries centrally at its free end a fixedly secured disc 72 of insulating material located within a metal collar 74 secured to the back face of housing 12. Metal collar 74 is carried coaxially with shaft 72 and serves as a contact for a pair of fine springs 76 upstanding from disc 72. The free ends of springs 76 are deflected outward into contact with collar 74 by the centrifugal force caused by rotation of motor 38.

The springs are connected by leads 78 to a central metal post 80 projecting rearwardly from disc 72 and terminating in a slip ring 82. A pair of output leads 84 and 86 are respectively connected to slip ring 82 and to collar 74. As should be apparent, there is electrical continuity between leads 84 and 86 only when the motor 38 is rotating. Thus motion detector 68 comprises a centrifugal switch.

Now, with reference to FIG. 5, the adapter 10 includes, in housing 12, a 12 volt D. C. negatively grounded power supply 88 which is energized from wall plug 42 via on-off switch 56 and a fuse 90. The positive 12 volt output line 93 from supply 12 controls five D. C. relays, K1 through K5, which in turn control the energization of motors 38 and 40.

Motors 38 and 40 are connected in common to a direct side of the A. C. line 92. The other ends of the motors 38 and 40 respectively connected to wipers 94 and 96 respectively associated with relays K4 and K5. The normally closed contacts associated with wipers 94 and 96 are connected in common to lead 98 which in turn is connected to the normally closed contact 100 associated with wiper 102 of relay K3. Wiper 102 is energized from the other side of the A. C. line via toggle switch 56 and fuse 90.

As will be apparent as the discussion proceeds, in a normal play mode all of the relays K1 through K5 are unenergized. Thus, A. C. power in such case is applied simultaneously to both motors 38 and 40 via contact wiper 102, contact 100, lead 98 and wipers 94 and 96. The motors 38 and 40 are connected for opposite rotation to tension the tape 34 and to take up the tape as it moves through head 32.

The normally open contacts associated with wipers 94 and 96 are connected in common to one end of a diode rectifier 104, the other end of diode 104 being connected to the normally closed contact 106 associated with wiper 102. The diode 104 and wipers 94 and 96 permit unidirectional braking current to be fed to an appropriate one of motors 38 and 40 during a stop mode initiated with button 50.

To understand the braking which terminates a fast forward or rewind mode, first it is necessary to understand the operation of these modes. In the fast forward mode, the relay K4 is latched via its own normally open contact set 106, interposed between its coil and a line 108. Line 108 is connected to the D. C. supply line 93 via the normally closed contact set 110 associated with relay K1. It will be understood as the discussion proceeds that relay K1 is energized only during the stop mode. Hence, D. C. voltage is available to maintain relay K4 energized via contact 106, providing it is first briefly placed in an energized position to complete the circuit through contact 106. To this end a normally closed interlock contact set 112 is provided associated with relay K5 and connected to supply line 93. Fast forward button switch 52 is connected in series between contact set 112 and the coil of relay K4 to enable momentary energization of the coil of relay K4, only if the relay K5 is not energized, by depressing switch 52 to latch relay K4. Thus only relay K4 is energized in the fast forward mode in which case wiper 96 is connected to line 98 for energization of only motor 40 through normally positioned wiper 102. Wiper 94 contacts the end of diode 104 and consequently is not energized thereby because of the normal positioning of wiper 102.

The operation of the rewind mode is exactly the converse of the fast forward mode. In the rewind mode only relay K5 is latched through its own normally open contact 114 by briefly energizing the relay coil via rewind push button 54 and the normally closed interlock contact set 116 associated with relay K4. Thus only motor 38 is energized.

In the rewind and fast forward modes, one of the motors 38 and 40 is coupled to line 98 and energized thereby through wiper 102 engaging contact 100, and the other of the motors is connected to the end of diode 104. Indicator lamps 60 and 62 are respectively connected in parallel with the coils of relays K4 and K5 to indicate which one of the relays is energized.

To terminate either the fast forward or rewind modes, stop button 50 is pushed to briefly energize to coil of relay K2.

The coil of relay K2 is connected to supply line 93 via its own normally open contact set 118 in series with motion detector 68. A capacitor 120 is connected in parallel with the coil of relay K to filter any contact bounce in motion detector 68. Thus relay K2 will latch upon depression of stop button 50 and remain in a latched condition as long as there is continuity through motion detector 68 indicative of the presence of motion.

Another normally open contact 122 of relay K2 is connected between supply line 93 and the parallel combination of indicator lamp 50 and the coil K3. Thus upon initiation of the stop mode, and the consequent energization of coil K3, wiper 102 contacts the diode 104 to provide uni-directional braking current to the one of motors 38 and 40, which had previously been unenergized. This continues until the motion detector indicates motion has ceased.

During this time, another wiper 124 to which is connected a grounded capacitor 124, contacts a normally open contact 128 which is connected to supply line 93. The normally closed contact 130 associated with wiper 124 is connected to the coil of relay K1. Thus during the stop mode, capacitor 126 is charged via contact 128. At the termination of the stop mode, when motion ceases, relay K2 unlatches, de-energizing relay K3. Consequently, wiper 124 engages contact 130 to allow the capacitor to discharge through the coil of relay K1. This discharge pulse energizes relay K1 to briefly open contact K1 to unlatch whichever of relays K4 and K5 which had been previously latched, thus returning to a normal play mode wherein both motors 38 and 40 are energized in opposite directions.

Having described the preferred embodiment of the present invention in great detail, it should be apparent that numerous modifications, additions and omissions in the details thereof are possible within the intended spirit and scope of the invention.

What is claimed is:

1. An adapter apparatus for 10½ inch diameter recording tape reels for use with a separate tape player having a playing head and a pair of capstans comprising a housing adapted to abut said separate tape player, a pair of capstans carried by said housing spaced apart on at least 10½ inch centers, said adapter capstans being positionable with respect to said playing head for projecting tape through said head without interferring with the capstans of said tape player.

2. The apparatus of claim 1 further comprising motor means in said housing for driving said adapter capstans.

3. The apparatus of claim 2 further comprising switch control means for controlling said motor means, said switch control means being located in a separate housing, connected to said adapter housing by a cable.

4. The apparatus of claim 2 wherein said motor means comprises a pair of motor respectively coupled to each adapter capstan and further comprising switch means for selectively energizing one, the other or both simultaneously of said motors for torqueing in opposite directions.

5. The apparatus of claim 4 wherein said motors are A. C. motors and further comprising motion detector means carried by one of said adapter capstans and braking circuit means for energizing one of said motors with uni-directional current during the time when motion is indicated by said motion detector means.

* * * * *